L. B. Clark,
Hop Pole.
No. 79,636.         Patented July 7. 1868.
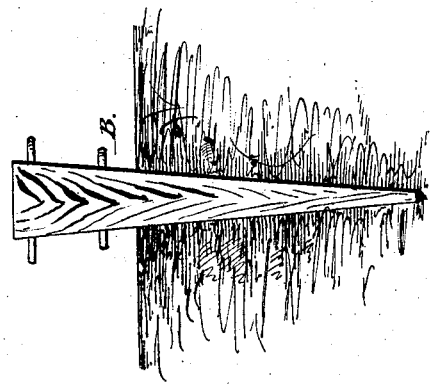
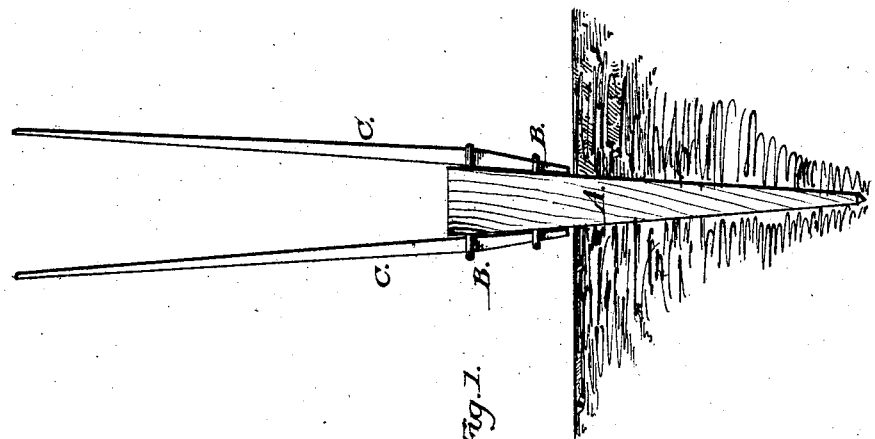
WITNESSES:         INVENTOR:

United States Patent Office.

LUMAN B. CLARK, OF BAINBRIDGE, NEW YORK.

Letters Patent No. 79,636, dated July 7, 1868.

IMPROVEMENT IN HOP-POLES.

*The Schedule referred to in these Letters Patent and making part of the same.*

TO ALL WHOM IT MAY CONCERN:

Be it known that I, LUMAN B. CLARK, of Bainbridge, in the county of Chenango, and State of New York, have invented a new and useful Improvement in Hop-Poles; and I do hereby declare that the following is a full, clear, and exact description thereof, which will enable others skilled in the art to make and use the same, reference being had to the accompanying drawing, forming part of this specification, in which—

Figure 1 represents a view of my improved pole fixed in the ground.

Figure 2 represents a view of the base of the same, with the top portion taken off.

Similar letters of reference indicate like parts.

The nature of my invention relates to improvements in poles used for raising hops, beans, peas, or any other climbing vegetable, whereby it is designed to provide poles that may be more readily and securely set into the ground, and which may be removed from the supporting part, which is driven into the ground, and be readily replaced again; and it consists in providing a tapered post of scantling, which may be driven into the ground, and which may form a base, to which the poles may be attached or readily detached, as will be more fully described.

A represents a base, formed of a piece of timber, of suitable size, with a tapered point, for driving into the ground. B represents staples, that may be driven into the sides of the upper end of the same, and C represents the upper portion of the poles, which may have their lower ends tapered, to fit securely in the said staples, the upper staples being preferably made larger than the lower ones. The same may be driven into all the sides of the post, and thereby support four, six, or any other number of branches or upper detachable portions, thereby providing means for the vines to separate more than a single pole will do. Instead of the staples B, metal bands may be used, or any similar means, for holding the two parts together.

By this arrangement, I am enabled to provide poles that may be more securely fastened into the ground, as with the single pole, that has its lower end forced into the ground, a hole must first be dug or made with a bar of iron, and then the pole is forced into it by raising it up by the hand, and forcing it down by the combined weight of the pole and the power of the hand; but this is a very unsatisfactory means, and generally fails to secure large poles with a sufficient degree of stability, whereas, by the use of my improved arrangement of poles, the part which enters the ground may be readily driven in to any extent by means of a sledge or maul, and be thereby very firmly secured.

Another important advantage of my improvement is that, after the crop has been harvested, the top portions of the poles may be gathered up and stored under protection of cover from the inclemency of the weather, and, being removed, thus facilitate driving over the ground with wagons, for the purpose of manuring the same, or for cultivating it, when such vines, as hops, are under cultivation, where the same root produces crops from year to year, and when the poles are required to stand for many seasons; and, when it is time for the crop to grow again, the poles may be restored to their places in the portions remaining in the ground.

By inserting the staples in the sides of the wedge C, the latter can be driven further into the ground, and reset, when loosened by the frost, or from other causes, without removing the poles C from the staples.

Having thus described my invention, I claim as new, and desire to secure by Letters Patent—

The hop-pole, consisting of the wedge A, lateral staples B, and poles C, all constructed as described, whereby it can be driven into the ground, and reset, when loosened by the frost, or from other causes, without disturbing the vines, as herein shown and described.

The above specification of my invention signed by me, this 15th day of February, 1868.

LUMAN B. CLARK.

Witnesses:
EPHRAIM BIXBY,
GIBSLON MUNS.